United States Patent
Marti et al.

(10) Patent No.: US 8,310,537 B2
(45) Date of Patent: Nov. 13, 2012

(54) DETECTING EGO-MOTION ON A MOBILE DEVICE DISPLAYING THREE-DIMENSIONAL CONTENT

(75) Inventors: Stefan Marti, San Francisco, CA (US); Seung Wook Kim, Santa Clara, CA (US); Han Joo Chae, Pittsburgh, PA (US)

(73) Assignee: Samsung Electronics Co., Ltd., Suwon (KR)

( * ) Notice: Subject to any disclaimer, the term of this patent is extended or adjusted under 35 U.S.C. 154(b) by 565 days.

(21) Appl. No.: 12/551,287

(22) Filed: Aug. 31, 2009

(65) Prior Publication Data
US 2010/0053322 A1    Mar. 4, 2010

Related U.S. Application Data

(60) Provisional application No. 61/093,651, filed on Sep. 2, 2008.

(51) Int. Cl.
*G06K 1/00* (2006.01)
(52) U.S. Cl. .................. 348/135; 382/154; 382/254
(58) Field of Classification Search .................. 701/301; 348/135; 382/154, 254, 266
See application file for complete search history.

(56) References Cited

U.S. PATENT DOCUMENTS

| | | | |
|---|---|---|---|
| 8,031,909 B2 * | 10/2011 | Se et al. | 382/106 |
| 8,031,933 B2 * | 10/2011 | Se et al. | 382/154 |
| 2006/0221072 A1 * | 10/2006 | Se et al. | 345/420 |
| 2009/0309765 A1 | 12/2009 | Wang et al. | |
| 2010/0017128 A1 * | 1/2010 | Zeng | 701/301 |
| 2010/0045667 A1 | 2/2010 | Kornmann et al. | |
| 2011/0315321 A1 * | 12/2011 | Yoshinaga et al. | 156/356 |

OTHER PUBLICATIONS

Toshiharu Mukai and Noboru Ohnishi; "Object shape and camera motion recovery using sensor fusion of a video camera and a gyro sensor"; Information Fusion I; 2000, pp. 45-53.

* cited by examiner

*Primary Examiner* — Khanh Dinh
(74) *Attorney, Agent, or Firm* — Beyer Law Group LLP (57) ABSTRACT

A method of measuring ego-motion speed of a mobile device is described. The linear motion of the device is measured using an image sensor component, thereby creating linear motion data. The rotational or angular motion of the device is measured using an inertial sensor component, thereby creating rotational motion data. The rotational and linear motion data of the device are used to calculate the ego-motion speed of the mobile device. This ego-motion speed can then be used to control a virtual camera control module for adjusting the view of 3D content viewed by the user on the mobile device as the user moves the device, changing the position of the virtual camera.

6 Claims, 9 Drawing Sheets

DETECTING EGO-MOTION ON A MOBILE DEVICE DISPLAYING THREE-DIMENSIONAL CONTENT

CROSS-REFERENCE TO RELATED APPLICATIONS

This application claims the benefit of U.S. Provisional Patent Application No. 61/093,651, titled "Gesture and Motion-based Navigation and Interaction with Three-Dimensional Virtual Content on a Mobile Device", filed Sep. 2, 2008, which is hereby incorporated by reference in its entirety.

BACKGROUND OF THE INVENTION

1. Field of the Invention

The present invention relates generally to systems and user interfaces for interacting with three-dimensional content on mobile devices and is in the general technical fields of Human-Computer Interaction (HCI), mobile multimedia platforms, mobile displays, and mobile virtual worlds. In particular, it is in the fields of motion estimation and spatial and gestural interaction.

2. Description of the Related Art

The amount of three-dimensional content available on the Internet and in other contexts, such as in video games and medical imaging, is increasing at a rapid pace. Consumers are getting more accustomed to hearing about "3-D" in various contexts, such as movies, games, and online virtual cities. However, mobile devices have so far not adapted to enabling users to navigate through and interact with 3-D content in a significant way. Unlike in the desktop setting, where the user may have external controllers available such as mice, joysticks, or game controllers, mobile users still mostly use buttons and keys, both physical and virtual, to interact with 3D content.

In addition, today's mobile devices do not provide an immersive user experience with 3D content because their displays allow only for a limited field of view (FOV). This is due to the fact that display size is limited by the size of the device. E.g., the size of a non-projection display cannot be larger than the mobile device that contains the display. Therefore, existing solutions for mobile displays limit the immersive experience for the user. Furthermore, 3D content such as virtual worlds on mobile devices are difficult to navigate, and small screen mobile devices do not provide good awareness of the virtual surroundings.

Previously, there have been a number of approaches to detect the ego-motion speed of a mobile device (i.e., the motion speed of a mobile device itself relative to a fixed frame work, such as the world/environment around it, detected with sensors on the device itself). One method is to use a single imager (visual) or image sensor (e.g., a built-in camera on a cellphone) to detect the overall optic flow of the background scenery in real-time. However, this approach does not allow distinguishing easily between shifting or linear motion and rotational motion, since the optic flow fields of these types of motions may be very similar.

Another method to detect ego-motion uses inertial sensors. Although such sensors can distinguish rotation motion from shifting motions (by using both rotational and linear accelerometers), this approach does not allow for direct measurement of ego-motion speed, since the sensors measure acceleration (not speed), which is then used, together with elapsed time, to calculate ego-motion speed. This calculation is not very precise, particularly with slow motions and low accelerations—conditions typical in user interface applications with gestural and motion control, particularly on mobile devices.

Motion controlled games on cellphones with gravity/orientation sensors and imaging sensors, gaming and other 3D content browsing applications employ motion control, only use the sensor, not the imaging sensor. Applications that use motion control for gaming applications currently use only two degrees of movement for measuring motion speed (particularly, rotation speed along pitch and roll axes). Some systems may use an additional sensor such as, a digital compass, which enables measuring a third rotational degree of movement (measuring yaw orientation and possibly yaw motion speed). However, none of these systems can detect translational speed motions (e.g., linear motions, with no or little acceleration).

In this system, optic flow data (from imaging sensors) and data from orientation sensors (or other types of inertial sensors) is combined. Mukai and Ohnishi studied the recovery of 3D shape from an image sequence using a video camera and a gyro sensor. (T. Mukai and N. Ohnishi, "Object shape and camera motion recovery using sensor fusion of a video camera and a gyro sensor," Information Fusion, vol. 1, no. 1, pp. 45-53, 2000). Since rotation and translation have similar effects on the image, leading to unreliable recovery, the orientation sensor output is used to discriminate both situations and improve the accuracy of the 3D shape recovery. However, this approach is limited by the following assumptions:

a. There has to be a rigid object that is fixed in the environment and has feature points that can be tracked.
b. The object's surface should be composed of polygons or close to that.
c. The translation and rotation are done mostly following X coordinates (X translation and yaw)
d. Camera is always pointing at the object In addition, this system focuses mostly on recovering the 3D image of the object.

Ego-motion detection of a mobile device (its own motion relative to a fixed framework, e.g., the world around it) has been investigated in detail in the past, and a number of different approaches have been tried so far, many of them have been used to successfully detect only certain kinds of motions or degrees of movement. As a result, the user is limited to only one or two degrees of movements.

It would be desirable to have a device that can measure ego-motion speed accurately without having to add any hardware, such as sensors. The user should not have to wear or hold any other device or sensor in order to track the motion speed of the device the user is holding. It would be desirable to use these ego-motion speed measurements in the interaction method called position-dependent rendering, without the need to add any hardware, such as control mechanisms like a joystick.

SUMMARY OF THE INVENTION

This invention improves the performance of existing applications on mobile devices, such as gaming, virtual world browsing, viewing 3D content, and others, and allows new kinds of applications, such as mobile 3D Internet browser, on handheld devices (cellphones, smartphones, media players, MIDs, UMPCs, etc.). This is done without additional hardware (e.g., joystick or additional sensors) and only with software.

Embodiments of the present invention give a user a total of four degrees for freedom to adjust perspective into a 3D environment or image by moving and positioning the handheld device in space, that is, making gestures in space holding the mobile device. In addition, it provides gesture recognition to initiate motion (e.g., avatar walking) within the 3D scenery. All perspective changes and navigation motions (virtual camera changes) are displayed on the screen in real-time, so the user feels like she is moving around in the middle of the 3D scenery. The invention gives the user of the device (e.g., cellphone), greater degrees of freedom in her interaction with 3D content, thus providing a richer and more intuitive interface with the content, without the need for any additional hardware.

In one aspect of the present invention, a method of measuring ego-motion speed of a mobile device is described. The linear motion of the device is measured using an image sensor component, there, thereby creating linear motion data. The rotational or angular motion of the device is measured using an inertial sensor component, thereby creating rotational motion data. The rotational and linear motion data of the device are used to calculate the ego-motion speed of the mobile device. This ego-motion speed can then be used to control a virtual camera control module for adjusting the view of 3D content viewed by the user on the mobile device as the user moves the device, changing the position of the virtual camera.

In one embodiment, the linear motion data includes optic flow vector values, which are used to calculate linear speed. In another embodiment, the rotational motion data includes roll data of the device and pitch data of the device. If it is determined that there is both linear motion data and rotational motion data, rotational motion data is utilized.

In another aspect of the invention, a mobile device includes one or more processors, a data storage component, an image sensor hardware component and image sensor software, an inertial sensor hardware component and inertial sensor software, and an ego-motion speed calculation module for calculating the speed of the mobile device using linear motion data from the image sensor software and rotational motion data from the inertial sensor software.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for measuring ego-motion speed of a mobile device are described in the various figures, where the measured speed, which indicates rotational and/or linear speed, is used to adjust a virtual camera for viewing 3-D content on the device. In one embodiment, a method to disambiguate shifting motion from and rotational motion without requiring more sensors than already in use on current mobile devices is described. In this manner, the various embodiments may be implemented using a software upgrade, which can be added easily to mobile devices, e.g., using application stores. The methods allow a more accurate ego-motion speed measurement than measurements based on inertial sensors alone.

In some embodiments, a user is able to view and navigate through 3D content displayed on a mobile device, such as a 3D scene in a virtual world or a 3D map from surround photos, without the use of a joystick or any type of additional controller. By simply holding the device and moving it in the space around the front of the user, the user can view the 3D scene and change perspective within the scene. The device responds to the user's movements and position changes in real-time. This can be referred to as "position-dependent rendering" of 3D content on mobile devices.

Figure 1:
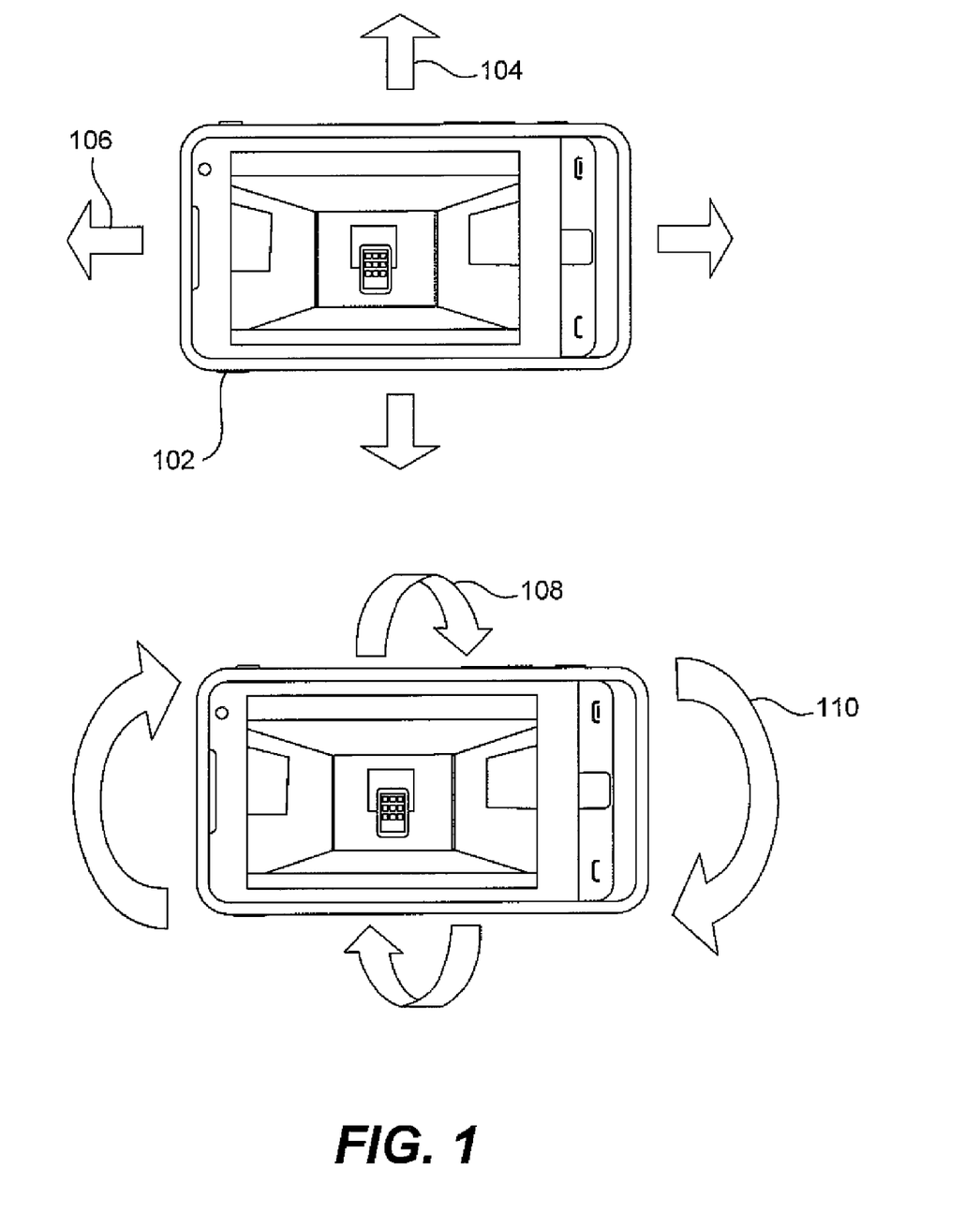
FIG. 1 is an illustration of a mobile device showing four degrees of movement that can be measured in accordance with one embodiment.

A user's motions when holding and moving a device in space can be divided into two different types: shifting (linear) motions and rotational (angular) motions. In one embodiment, shifting motions are in two dimensions, namely, left-right along an x-axis or up-down along a y-axis, and are detected by image sensor processing of optic flow data provided by an imager or image/visual sensor component, often a camera on the device. These shifting motions are shown in FIG. 1. A mobile device 102 can be moved left-right as shown by arrows 106 or up-down shown by arrows 104, on a single plane. These are linear motions on a parallel plane. The speed of these linear motions is provided, in one embodiment, directly by an image sensor software module, as described below. The optic flow detection algorithm used by an image sensor to provide this linear speed data is computationally light-weight and so can be run on mobile devices which have low processing power and still maintain performance and accuracy.

The rotational motions are also in two dimensions, namely pitch and roll, and are detected by an inertial sensor, specifically an orientation sensor, such as a gravity sensor (G-sensor) or other type of orientation sensor. The inertial sensor works in the device to detect rotational motions. Pitch is shown by arrows 108 and roll is shown by arrows 110.

Combining optic flow vector values from imaging sensors and data from orientation sensors using a software component allows the mobile device to distinguish between shifting and rotational motions without adding complex computational steps or requiring additional hardware (e.g., image or inertial sensors or controllers operated by the user, such as joysticks). By differentiating shifting from rotational motions, the user has more degrees of freedom in movements or gestures while holding the device than can be provided by existing mobile device applications. In addition, since the image sensor provides optic flow information, the linear ego-motion speed of the device is more precise than measurements of linear speed that can be provided from inertial sensors alone, which need an integration step to calculate linear speed from acceleration and elapsed time, making it susceptible to accumulation errors over time.

Figure 2:
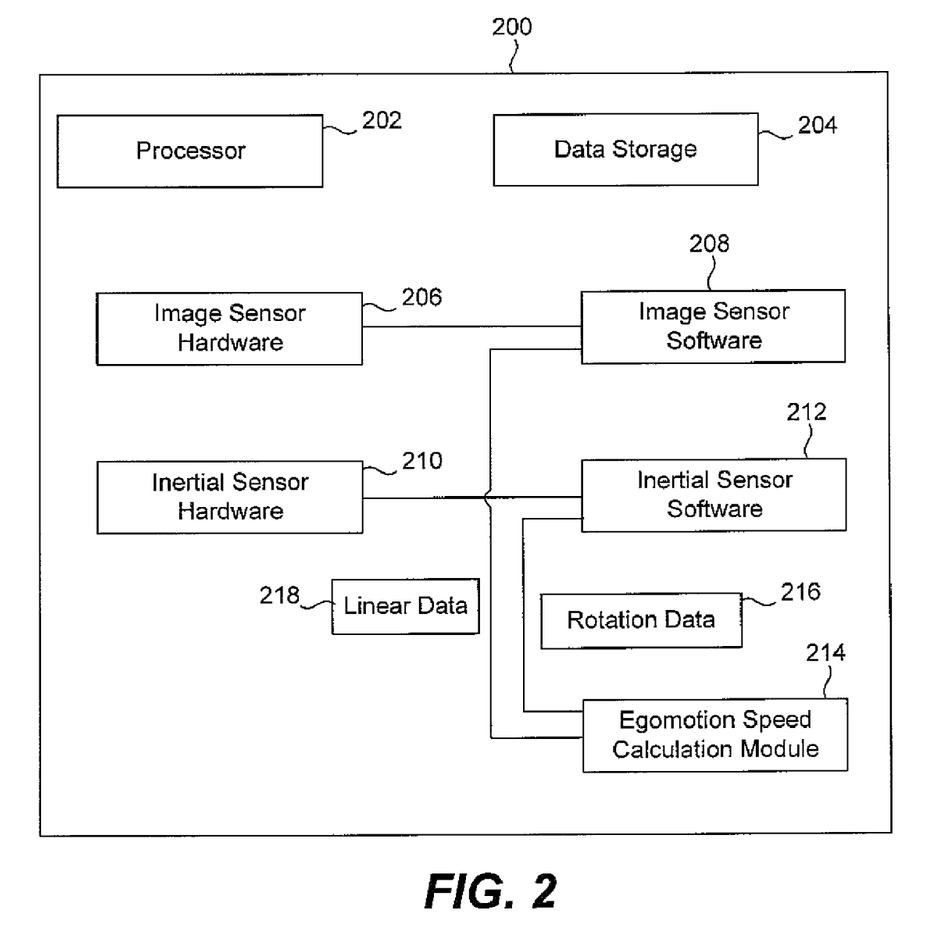
FIG. 2 is a block diagram showing components of a mobile device in accordance with one embodiment of the present invention.

FIG. 2 is a block diagram showing components of a device in accordance with one embodiment. A mobile device typically has one or more processors 202 and data storage components 204, as described further in FIG. 7. Image sensor hardware 206 represents the actual hardware components of an image sensor subsystem and may include cameras, lenses, or other image capturing mechanisms. Optic flow vector values from image sensor hardware 206 are transmitted to image sensor software module 208. In one embodiment, this data is processed by module 208 to produce linear ego-motion speed data. In another embodiment, module 208 processes data from hardware 206 and transmits vector values to a calculation module, described below. As discussed below in FIG. 6, an image sensor may not be accurate in distinguishing linear motion from angular motion. Thus, there may be instances where device 200 is moved rotationally (and not shifting) and image sensor 206 and software 208 may interpret this movement as linear movement and transmit vector values to the calculation module. Steps for disambiguating linear data in these instances are described in FIG. 6.

Inertial sensor hardware 210 includes orientation sensors, such as gravity sensors or other types of sensors. Data from sensor hardware 210 is transmitted to inertial sensor software module 212. This data may be absolute data indicating the angular position of device. As is known in the field, inertial sensors can measure gravity or, more specifically, positional deviations from gravity of an object containing the sensor. In one embodiment, linear motion data 218 and rotation data 216 are transmitted to ego-motion speed calculation module 214. As described above, rotation data 216 may consist of data on two DOFs, pitch and roll, and linear data 218 may be data on another two DOFs, horizontal and vertical movement of the device.

In one embodiment, an image sensor performs optic flow analysis on an entire image in order to detect the general motion of the device itself (ego-motion), rather than tracking features of a certain object. In this embodiment, optic flow data is used solely to detect shifting motion. As noted, a gravity sensor is used to detect rotation motion with precision. By virtue of this division of labor (i.e., linear motion analysis vs. rotation motion analysis), it is possible to successfully differentiate shifting motion from rotational motion.

To obtain four DOFs mentioned above, it is necessary to differentiate between shifting and rotational motion. Using computer vision alone, i.e., imaging sensors, such as cameras, it is a non-trivial task to compute both and would use considerable amount of processing power. This task is simplified by combining optical flow data from a camera (common on many cellphones today), and measurements from an orientation sensor, increasingly common in current cellphones.

To detect shifting speed in two dimensions (motions in both vertical and horizontal directions that are parallel to the imager plane), overall optical flow detection is performed on a series of images captured by a camera (most commonly facing away from the user, on the back of the device). Since optical flow is sensing motion from vision, it is able to detect slow or constant speed shifting motions which have little or no acceleration at all. In addition, the algorithm for optic flow is computationally light weight, so that it can be run even on a device with low computing power while keeping appropriate performance and accuracy. The speed measurements from optic flow vector values may be relative or comparative speeds, such as slow, intermediate slow, intermediate, intermediate fast, and fast. An average distance value or constant distance value may be used to arrive at these speed indicators. In this embodiment, the speed value is not an absolute measurement, such as x meters/second. In another embodiment, a distance measurement to an object or scene is measured and used to arrive at an actual speed measurement. This alternative embodiment is described below in FIGS. 3 and 5.

To detect rotational speed and orientation in two dimensions (pitch and roll), a gravity sensor is used which measures gravitational forces, and therefore device orientation may be provided in two dimensions. Changes over time in the two-dimensional orientation of the device can be used to create two-dimensional rotation speed.

The combination of linear speed data and rotational speed data enables a device to measure ego-motion of a mobile device which, in turn, allows the user to move the display device freely in four dimensions. These are up-down, left-right, pitch, and roll, while the detected motions are used to display, in real-time, 3D content (e.g., 3D game scene, 3D map, 3D virtual world, 3D desktop GUI, 3D Internet, etc.) which is adjusted to the user's perspective in 3D. As noted above, this may be referred to as position-dependent rendering.

A gravity sensor can also be used to detect abrupt external forces on the device. For example, if the user shakes the device for a short period of time, making a "flicking" gesture, the device can detect this abrupt motion. By exploiting the detection of such motions, embodiments of the present invention provide a simple gestural way for the user to initiate, for example, forward moving motion within the 3D scene. If the user shakes the device (or exerts any kind of abrupt acceleration on the device), the 3D scene may be displayed as if the user is "walking" within the 3D scene (or generally moving forward); detecting another shaking or "flicking gesture" once more will stop the walking motion.

Figure 3:
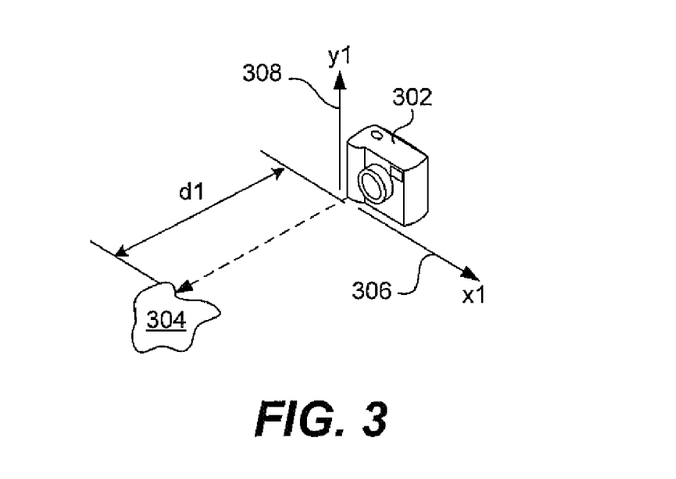
FIG. 3 is a block diagram showing one imager and optic flow vectors in accordance with an alternative embodiment.

FIG. 3 shows a block diagram of one imager and associated optic flow vectors and a distance value in accordance with an alternative embodiment. As noted above, an imager may obtain a distance value and use this value to calculate a linear ego-motion speed value (as opposed to a comparative speed value). The distance between imaging sensor 302 and object 304 is d1. This distance measurement may be obtained using an autofocus system in the device. The optical flow vector has horizontal component x1 (arrow 306) and vertical component y1 (arrow 308). The shifting (linear) speed of a device having one imaging sensor may be computed using the value derived from taking the product of d1 and x1, x1*d1.

In one example, the actual shifting (linear) speed of the device was determined as 0.5 m/s (using an external calibration method). Furthermore, in this example, the device having one 2D imaging sensor captures a scene that is 0.6 meter away from the imager. The imaging sensor has a resolution where 1 pixel is approximately 0.008 meters in the actual scene, i.e., 0.008 m/(pixel*m). The imager has a frame rate of 10 frames/second (1 frame each 0.1 seconds). The horizontal optical flow magnitude between two consecutive frames (at a specific time, t) is determined to be +10 pixels (positive to provide direction based on FIG. 4, below) for the imager. The scene distance estimate (at specific time, t) from the imager to the scene/object in front of it is 0.6 meters. In this scenario, x1=10 pixels and d1=0.6 meters.

Figure 4:
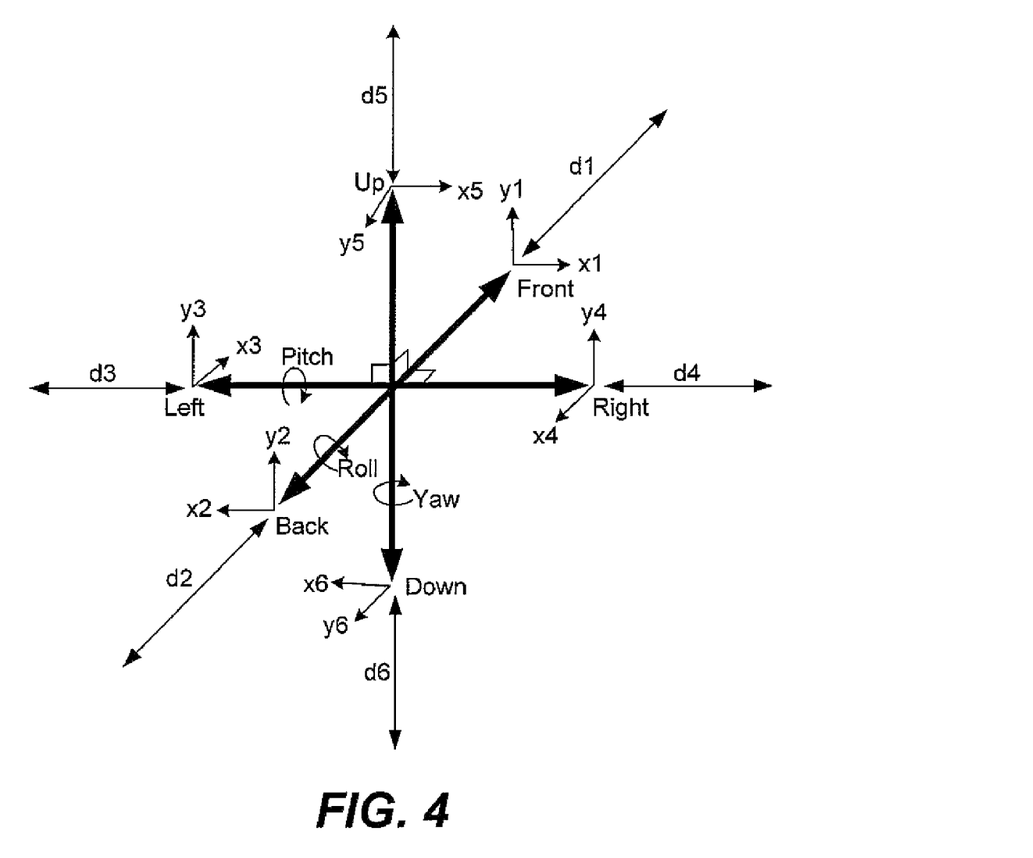
FIG. 4 is a graph showing a coordinate system showing various degrees of freedom of a device in accordance with one embodiment.

To calculate the shifting (linear) speed, measured in m/s, the resolution (0.008 m/(pixel*m)) and the frame rate (1 frame/0.1 second) are used to complete the calculation. Using the equation described above: x1*d1, we have (10 pixels*0.6 m)=6 pixel*meter. To complete the calculation and arrive at the correct units for linear motion, this result is multiplied by the resolution factor and then divided by the frame rate. Thus, 6 (pixel*m)*0.008 m/(pixel*m)=0.048 m. This result is divided by the frame rate of 0.1 sec/frame giving: 0.048 m/0.1 sec=0.48 m/sec. This is 96% of the actual device motion value of 0.50 m/sec.

FIG. 4 is a three-dimensional coordinate system showing different motions that a mobile device may undergo and the variables associated with these movements. It also shows distance values ("distances") that are used in methods for calculating ego-motion speeds described below. It shows 2D and 3D optical flows with "distance factors" in six directions and 6DOF motions. The x-axis measures left-right motion, the y-axis measures up-down motion, and the z-axis measures forward and backward motion of a mobile device. A device can rotate on the x-axis (pitch) and on the z-axis (roll). A device can also rotate on the y-axis (yaw). Linear movement of the device to the right is indicated by x1 and x5 and to the left by x2 and x6. Linear movement of the device upwards is shown by y1, y2, y3, and y4. Forward movement is shown as x3 and backward movement is x4, y5, and y6. In one embodiment, there is no downward movement.

Figure 5:
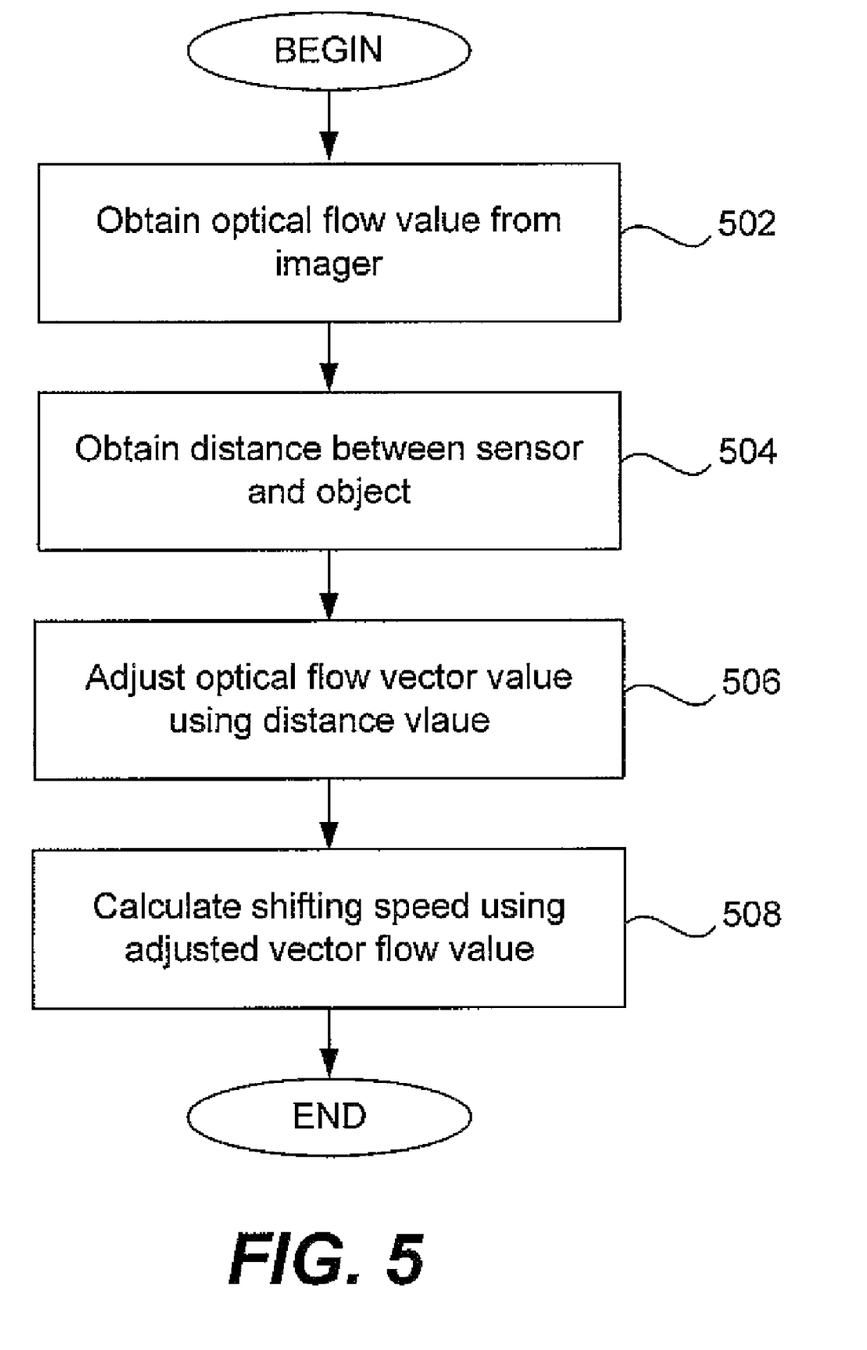
FIG. 5 is a flow diagram of a process of calculating ego-motion speed of a mobile device using a single imager in accordance with one embodiment.

FIG. 5 is a flow diagram of a process of calculating linear ego-motion speed of a mobile device having an imaging sensor in accordance with one embodiment. It is assumed that the mobile device, such as a cell phone or a gaming device, has been powered on and that the imaging sensor, such as a camera or other optic flow sensor, is active and that the device is being held by a user using it in a generally conventional manner. At step 502 the imaging sensor of the mobile device obtains optical flow data values.

At step 504 the imaging sensor obtains an estimated distance value between the sensor lens and an object or scene within the field of view of the sensor. This is done using optical flow values. As described above, if there is no salient object, the sensors estimate distances to an overall scene. The distance estimate need not be precise in order for the method described to calculate ego-motion speed of the mobile device. The distance estimate may be coarse or precise. However, regardless of the resolution of the distance estimate, having some information about distance will increase the precision of linear ego-motion speed calculation. The distance estimate may be used to modify the 2D optical flow vector values using a simple calculation. The distance value, d1, may be measured in meters or any other suitable unit.

The primary output of the imager is a set of optical flow vector values. For example, referring to FIG. 4, the output of the imager facing the "Front" has vector values, x1 and y1, as shown in FIG. 3. An object or scene in front of the imager is d1 distance away. At step 506 the optical flow vector value is modified, or weighted, using the distance value. Thus, vector value x1 is modified by being multiplied by d1 (x1*d1).

At step 508 a shifting (linear) speed of the mobile device is calculated using the modified horizontal and vertical optical flow vector values. Referring to FIG. 4, the horizontal vector value corresponds to all the x values (x1 to x6) and vertical vector values correspond to all the y values (y1 to y6). For example, if the imager is facing "Down," the horizontal optical flow vector value x6 (as modified) may be used to calculate left-right shifting speed, since there are no vertical components. An actual shifting speed having the correct unit value is calculated using a resolution factor, such as the 0.008 m/(pixel*m), and a frame rate, such as 10 frames/second, both from the example above. After the optical flow vector value has been adjusted, the result is multiplied by the resolution factor and the result of this product is divided by the frame rate of the imager. These two calculations take into account properties of the specific imager being used and provide the correct units of the final result (e.g., meters/sec).

At this stage the process of detecting the ego-motion speed of a device having one imaging sensor is complete.

Figure 6A:
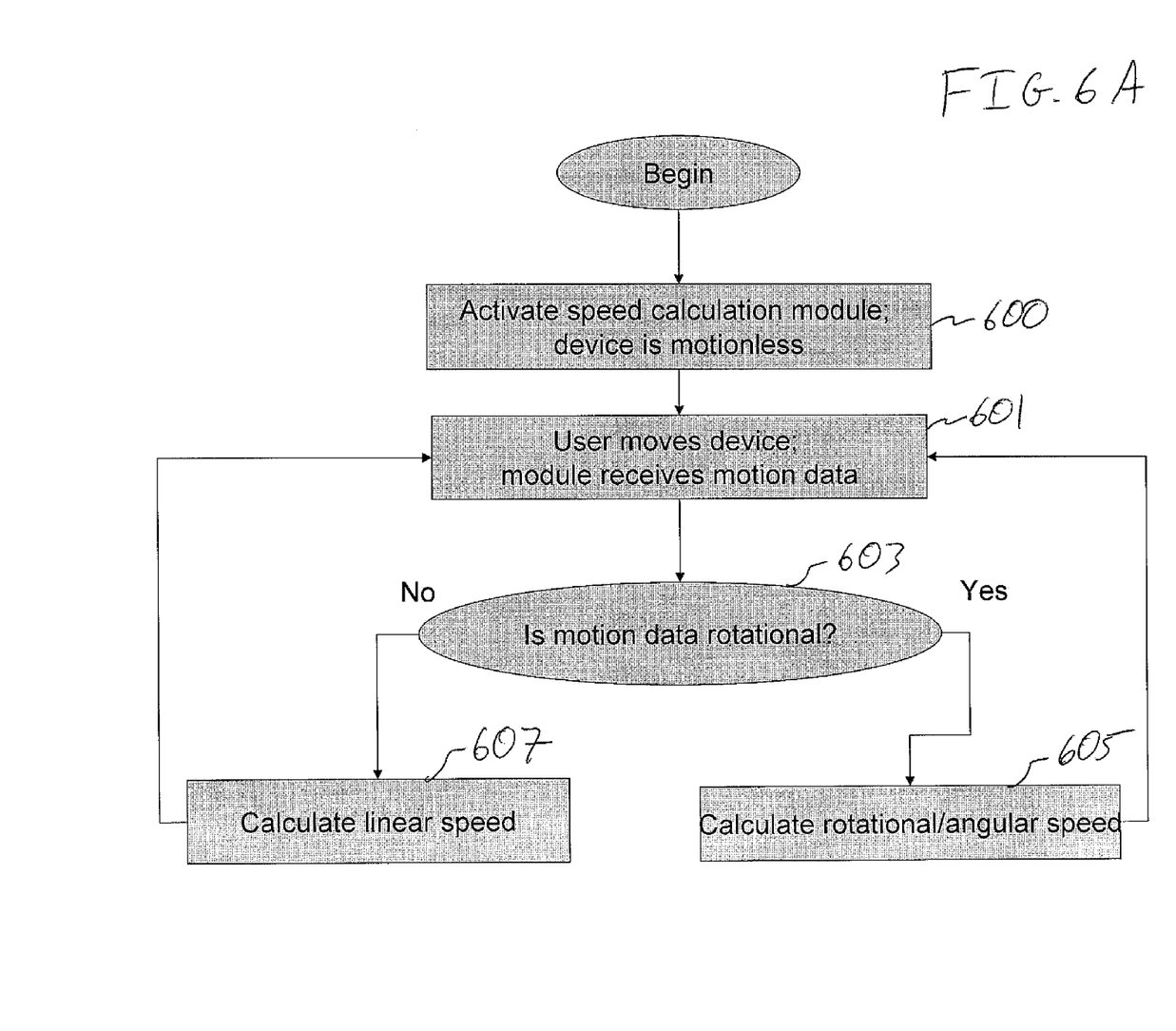
FIGS. 6A and 6B are flow diagrams of processes of obtaining rotational and linear movement data from sensors within a mobile device in accordance with various embodiments.

FIG. 6A is a flow diagram of a process of calculating ego-motion speed of a mobile device using image sensors and inertial sensors in accordance with one embodiment. At step 600 the ego-motion speed calculation module is activated. This may be done when the mobile device is powered on or the device may have a separate means for specifically turning on this feature. For example, it may be "Activate 3D Browser," "Enable 3D Content Navigation," or something similar. Note that the ego-motion speed is used by the virtual camera which is directly associated with the actual end user application, as described below. At this stage, it is assumed that the device is motionless.

At step 604 the user begins moving the device. As described above, in one embodiment, the device is able to detect four DOFs, two that are linear and two that are rotational. The calculation module receives motion data from one or two sensor types: an inertial sensor and/or an image sensor. Specifically, as shown in FIG. 2, it receives motion data from either image sensor software module 208 or from inertial sensor software module 212. The motion data received by calculation module 214 may be in one of various forms. For example, the data from image module 208 may be optic flow vector values (typically in pixels) or may be an actual speed value (e.g., in meters/second). If vector values are transmitted, calculation module 214 performs further steps, such as a mapping of vector values to speed, to arrive at an actual linear ego-motion speed. Data from inertial sensor module 212 may be in some form of absolute angular data (degrees) which module 214 can use to derive an angular speed.

At step 603 the speed calculation module examines the data and determines whether it is rotational data from an inertial sensor. This may be done by examining the format of the data, the data type, a header, or using data indicators. If the data is rotational or angular, control goes to step 605 where the rotational/angular speed of the device is calculated. Control then returns to step 601 where, if the user moves the device, the module receives the "next" motion data. If at step 603 it is determined that the motion data is not rotational, control goes to step 607. At this stage it is implied that the data is linear motion data and the speed calculation module calculates the linear speed of the device at step 607. Once this is done, control returns to step 601. As can be seen from FIG. 6A, there is a continuous execution loop, as long as the device is in motion. Either the device is in linear or shifting motion or it is being rotated or turned at some angle. The nature of this loop, and specifically decision step 603, illustrates that rotational motion data from the inertial sensor takes priority over linear data from an imaging sensor. In other embodiments, this priority may not be necessary and both types of motion data are treated equally.

Figure 6B:
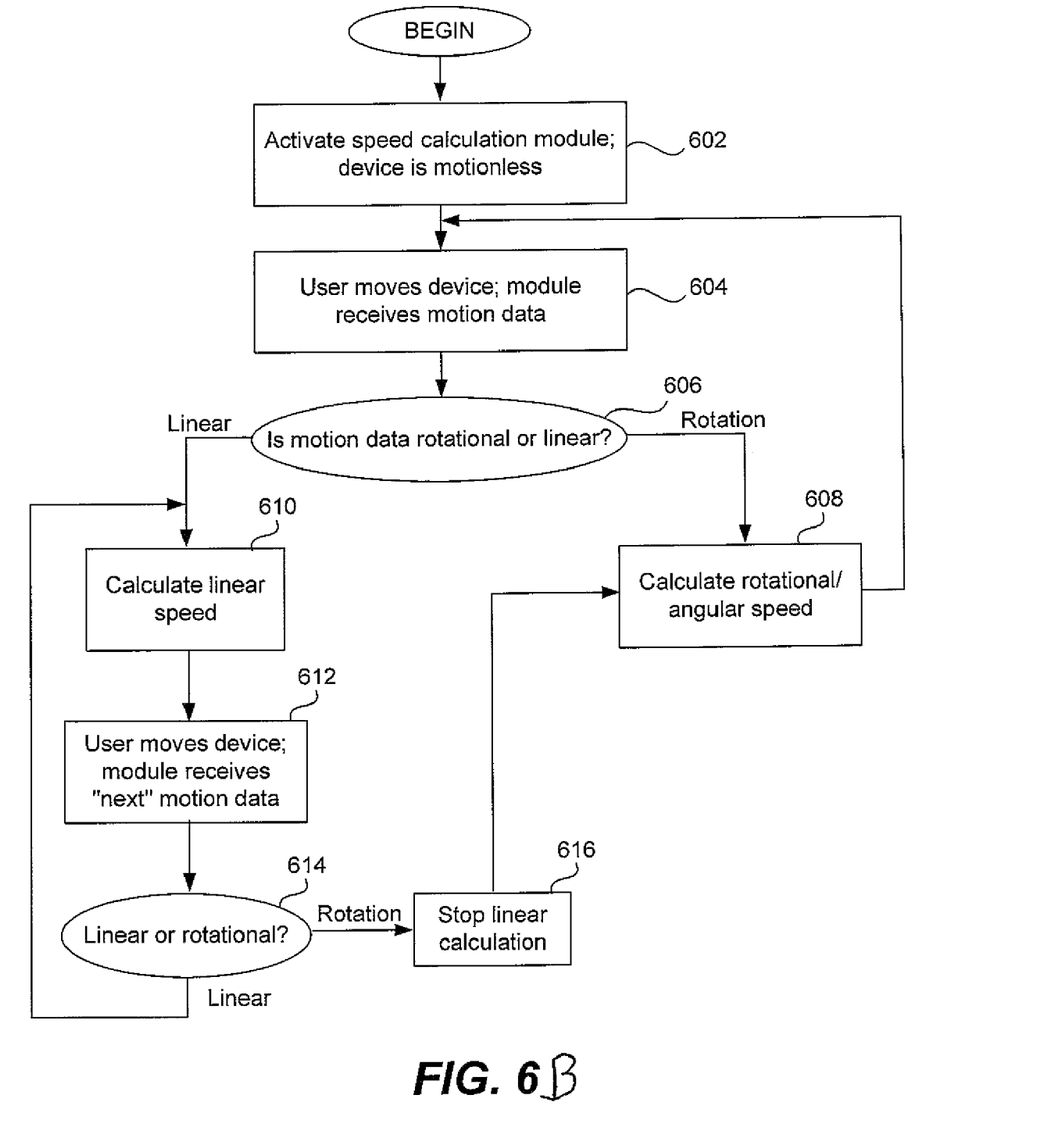

FIG. 6B is a flow diagram of an alternative process of calculating ego-motion speed of a mobile device using image sensors and inertial sensors in accordance with another embodiment. At step 602, the ego-motion speed calculation module is activated. This may be done when the mobile device is powered on or the device may have a separate means for specifically turning on this feature. At this stage, it is assumed that the device is motionless.

At step 604 the user begins moving the device. As described above, in one embodiment, the device is able to detect four DOFs, two that are linear and two that are rotational. The calculation module receives motion data from one or two sensor types: an inertial sensor and/or an image sensor.

At step 606 calculation module examines the data and determines whether it is rotational data from an inertial sensor or linear data from an imaging sensor. If the data is rotational or angular data, control goes to step 608 where the calculation module calculates the angular speed of the mobile device. As noted, this may be done by mapping raw angular data to an angular speed using time. As is known in the field, inertial sensors are very efficient and accurate with respect to measuring angular/rotational movement. This speed may be in degrees per second or may be a comparative measure such as no speed, low speed, medium speed, and so on. Control then returns to 604 where the user, at this stage, continues moving the device and motion data is transmitted to the calculation module. Naturally, as long as the user is holding and using the device (e.g., cell phone, mobile gaming device, and the like), there will be a constant flow of motion data to calculation module 214 which will, essentially, constantly be calculating either a rotational speed as in step 608 or a linear speed.

If the motion data is determined to be linear, at step 610 the calculation module calculates the linear speed. As noted, this linear speed may be comparative (or relative), such as no speed, low speed, intermediate speed, and so on. In this embodiment, a distance is assumed (e.g., an average distance to an object) and is used to arrive at an estimation of speed, as opposed to an actual speed. Or, in an alternative embodiment, it may be an actual speed, measured in suitable units (e.g., meters/second). As described above, in this alternative embodiment, an actual distance, d1, is measured (e.g., using an autofocus system) and used in calculating a speed.

The user continues to use the device thereby moving it and the calculation module receives this motion data at step 612. This step is the same as step 604 (it is repeated here for ease of illustration). At step 614, the calculation module determines whether the next motion data it receives is linear or rotational, as it does in step 606. This decision step is repeated here as step 614 to illustrate a particular feature of the invention, which may be referred to as disambiguation of linear and rotational motion.

As is known in the field, image sensors are not very accurate with respect to differentiating between linear and rotational movement. A device may be rotated or moved in an angular direction by the user (without any linear movement), and many image sensors currently in use may interpret this angular movement as linear movement. As a result, in some cases linear movement data may be sent by the imager when, in fact, the device is only being turned by the user. In contrast, imaging sensors are very efficient and accurate in detecting actual linear movement. On the other hand, inertial sensors are very efficient at detecting angular movement of a device. Thus, in a few cases, linear motion data from the imaging sensor may represent angular motion and not linear motion. If rotational data is received at the same time as linear data or while linear calculations are being performed, this rotational data is used to disambiguate the linear motion data. In other words, it is used by the calculation module to determine that the linear data is a result of angular motion and, thereafter, ignore or bypass the linear data and use the rotational data to calculate rotational speed. At step 614 the calculation module determines whether the new motion is linear or rotational motion. If it is determined at step 614 that the motion data is linear data, control returns to step 610 where the linear speed is calculated. If the next motion data is rotational data, control goes to step 616 where the linear speed calculation is stopped. In this case, the linear motion data received, which may have been received at the same time or before the rotational data, actually resulted from angular movement of the device. In this case, the calculation module uses the rotational motion data from the inertial sensor and control goes from 616 to step 608 where the rotational speed is calculated. This process continues until the speed calculation module is turned off, or the mobile device is powered off. The calculation module may be deactivated, for example, if the device is stationary for a certain length of time or if the user specifically turns off the feature, perhaps to conserve battery.

Figure 7A:
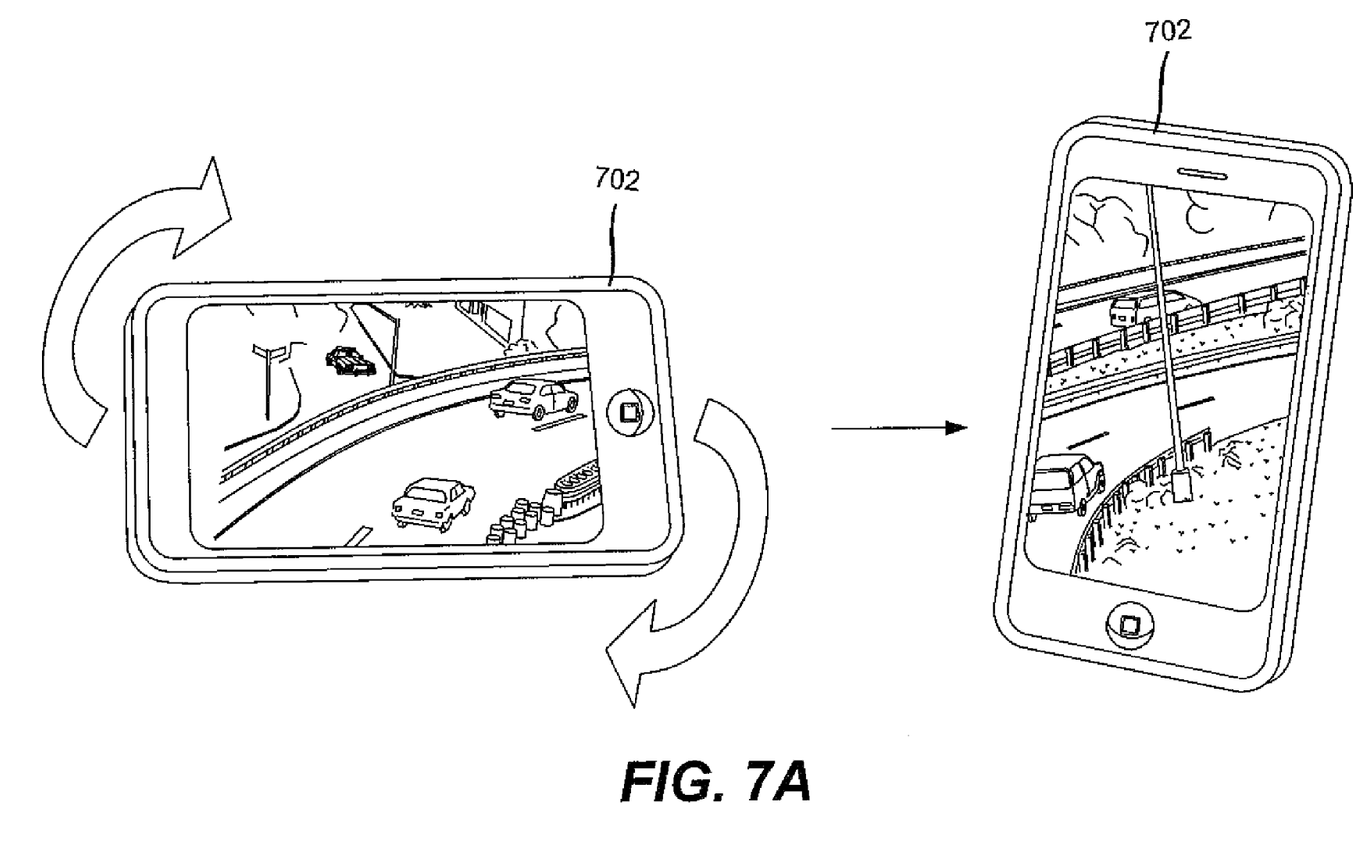
FIGS. 7A and 7B are illustrations of a mobile device being used as virtual cameras for viewing 3D content in accordance with one embodiment.
Figure 7B:
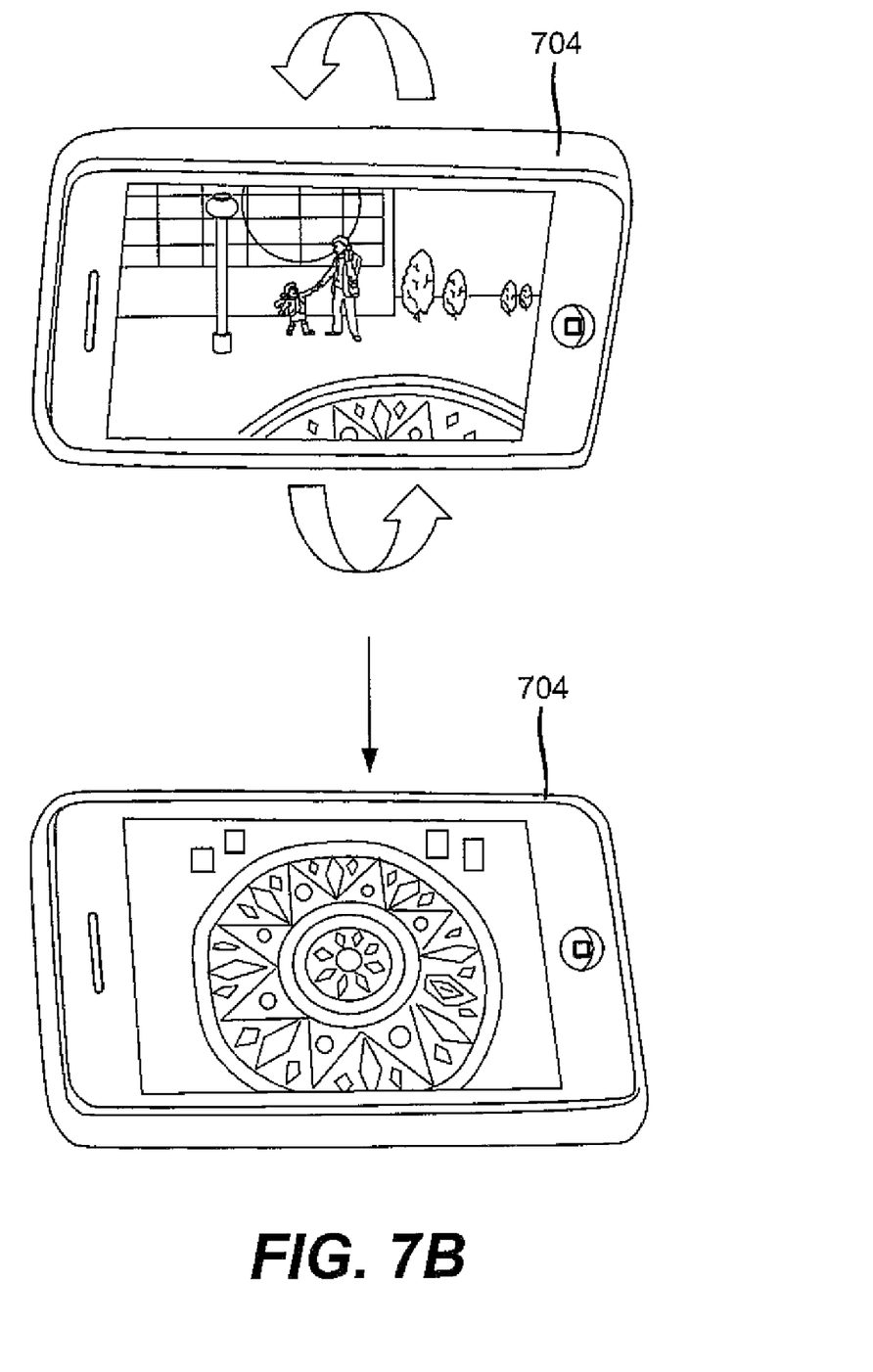

Ego-motion speed data is the output of speed calculation module 214 and is used, in one embodiment, by a virtual camera control module. This module is used to control a virtual camera into 3D content and essentially enables position-dependent viewing of such content. An important feature of using the mobile device as a "3D browser" into, for example, an online virtual world, is that the virtual camera move at the same speed as the device. Therefore, the speed of the device is a critical component in making the 3D browsing ability of the device appear intuitive, realistic, and accurate to the user. If the virtual camera did not move at the same linear speed and same angular speed as the mobile device, the user's view into the 3D content (via the device's display) would be awkward from the disconnect between the user's real world movements and the navigation through the 3D content. Examples of viewing a virtual 3D environment on a cellphone are shown in FIGS. 7A and 7B. In FIG. 7A a cellphone 702 in a first position displays a virtual world street with cars at time t1. The user moves cellphone (or any mobile device) 702 to a second position at time t2 and displays a different portion of the virtual world street. In FIG. 7B a cellphone 704 displays a scene in a virtual world at time t1. The scene is of a mosaic on the ground with some people standing in the background shown at a specific angle. The user moves cellphone 704 to a second position at time t2 where a different angle of the mosaic is shown (where the people are not visible). In both these examples, the linear and angular speed of the device is used to calibrate the speed of the virtual camera into the 3D content. In this manner, the mobile device can be used as a 3D browser for viewing virtual world and various other types of 3D content.

Thus, various embodiments of the present provide interaction methods and technologies for improving the user's interaction with 3D content on mobile devices. As noted above, one interaction method can be referred to as "position-dependent rendering": instead of using button presses, the user utilizes the space around her, treating the mobile device's display as a "window" into, e.g., a 3D virtual world-just like looking through a small window, as shown in FIGS. 7A and 7B. This window is not static, though: the user can move it around, creating a much larger "virtual view." In order to implement this interaction method, it is necessary to determine the position of the mobile device in space (location and orientation) as accurately as possible. As described above, detecting location, orientation, and motion speed of a device itself is generally referred to as "ego-motion detection" (the device determines its own motion speed without external sensors). In other words, in order to navigate a 3D scene by simply moving the device around, ego-motion detection is necessary to detect the motion of the device itself, so that the device knows exactly how and where it has been moved in space.

Figure 8:
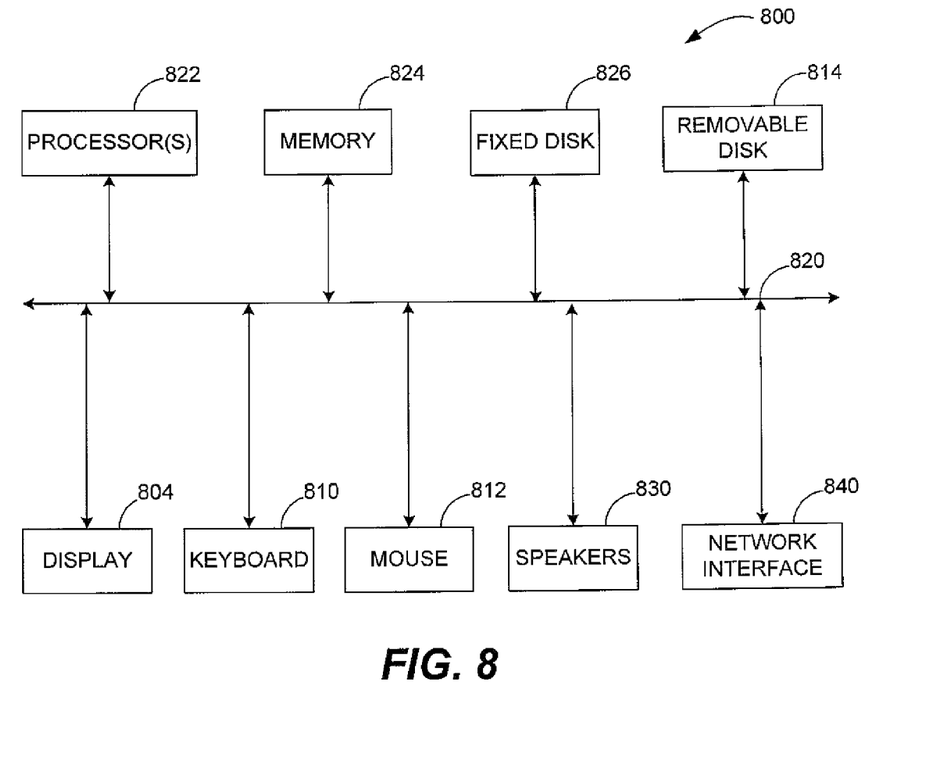
FIG. 8 illustrates system components suitable for implementing embodiments of the present invention.

FIG. 8 illustrates components of a computing system 800 suitable for implementing embodiments of the present invention. Attached to system bus 820 are various subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 814 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing. Finally, device 800 has as one or more of its subsystems imaging sensor hardware and inertial sensor hardware as shown in FIG. 2.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of measuring ego-motion speed of a hand-held mobile device displaying 3D content, the method comprising:

measuring linear motion of the mobile device using an image sensor component, thereby creating linear motion data;

measuring rotational motion of the mobile device using an inertial sensor component, thereby creating rotational motion data;

determining whether data received at a speed calculation module is rotational motion data or linear motion data;

combining the rotational motion data and the linear motion data to calculate ego-motion speed of the mobile device; and adjusting the 3D content to a viewer perspective using the ego-motion speed of the mobile device.

2. A method as recited in claim 1 wherein the linear motion data includes optic flow vector values.

3. A method as recited in claim 2 further comprising:
calculating linear speed using the optic flow vector values.

4. A method as recited in claim 1 wherein the rotational motion data includes roll data of the device and pitch data of the device.

5. A method as recited in claim 1 further comprising:
giving priority to the rotational motion data if linear motion data and rotational motion data are produced.

6. A hand-held mobile device having a screen for displaying 3D data comprising:

one or more processors;

a data storage component;

an image sensor hardware component and image sensor software;

an inertial sensor hardware component and inertial sensor software;

an ego-motion speed calculation module for calculating the ego-motion speed of the mobile device using linear motion data from the image sensor software and rotational motion data from the inertial sensor software by combining the rotational motion data and the linear motion data and for determining whether data received is rotational motion data or linear motion data; and a virtual camera control module for adjusting the 3D data to a viewer perspective using the ego-motion speed of the mobile device.

\* \* \* \* \*